United States Patent
Bansleben et al.

(10) Patent No.: US 6,506,860 B1
(45) Date of Patent: Jan. 14, 2003

(54) REGIO-REGULAR COPOLYMER AND METHODS OF FORMING SAME

(75) Inventors: Donald Albert Bansleben, Columbia, MD (US); Truc-Chi Thi Huynh-Tran, Burtonsville, MD (US); Rusty Lew Blanski, Columbia, MD (US); Paul Anthony Hughes, Columbia, MD (US); William Peyton Roberts, Spartanburg, SC (US); Robert Howard Grubbs, South Pasadena, CA (US); Galen Richard Hatfield, Ellicott City, MD (US)

(73) Assignee: Cryovac, Inc., Duncan, SC (US)

( * ) Notice: Subject to any disclaimer, the term of this patent is extended or adjusted under 35 U.S.C. 154(b) by 287 days.

(21) Appl. No.: 09/671,163

(22) Filed: Sep. 28, 2000

Related U.S. Application Data

(62) Division of application No. 09/052,079, filed on Mar. 31, 1998, now Pat. No. 6,153,714.

(51) Int. Cl.[7] .............................. C08F 4/80; C08F 32/04
(52) U.S. Cl. ................. 526/171; 526/170; 526/308; 526/309; 526/301.5; 526/317.1; 526/318.2; 526/318.43; 526/306
(58) Field of Search ................. 526/171, 170, 526/308, 309, 307.5, 317.1, 318.2, 318.43, 306

(56) References Cited

U.S. PATENT DOCUMENTS

| | | | |
|---|---|---|---|
| 4,816,521 A | * | 3/1989 | Asrar |
| 4,891,414 A | * | 1/1990 | Asrar |
| 4,940,758 A | * | 7/1990 | Wong |
| 5,763,101 A | * | 6/1998 | Yoshimi et al. |

FOREIGN PATENT DOCUMENTS

| | | | |
|---|---|---|---|
| EP | 0 626 402 | * | 11/1994 |
| EP | 0 735 081 | * | 10/1996 |
| EP | 0 791 615 | * | 8/1997 |
| EP | 0 796 607 | * | 9/1997 |
| JP | 0 244 158 | * | 9/1996 |
| JP | 0 244 180 | * | 9/1996 |
| JP | 0 253 676 | * | 10/1996 |
| JP | 0 259801 | * | 10/1996 |
| JP | 0 259802 | * | 10/1996 |
| JP | 0 235370 | * | 9/1997 |
| JP | 0 081745 | * | 3/1998 |
| JP | 0 204121 | * | 8/1998 |
| WO | WO 93/20111 | * | 10/1993 |
| WO | WO 97/20865 | * | 6/1997 |
| WO | WO 98/37110 | * | 2/1998 |

OTHER PUBLICATIONS

Hillmyer, Macromolecules, 28, 6311–6316, 1995.*
Yates, Canadian Journal of Chemistry, 50, 1548–1556, 1992.*
Breslow, Prog. Polym. Sci., 18, 1162–1163, 1993.*
Hillmyer et al., "Ring–Opening Metathesis Polymerization of functionalized Cyclooctenes by a Ruthenium–based Metathesis Catalyst", macromolecules, vol. 28 (18), Aug. 28, 1995, pp. 6311–6316.*
Maughon et al., "Synthesis and Controlled cross–linking of Polymers derived from Ring–Opening Metathesis Polymerization (ROMP)", Macromolecules, vol. 29 (18), Aug. 26, 1996, pp. 5765–5769.*
J. of Polymer Science, Part A, vol. 36, p. 889–900(1998).*

* cited by examiner

*Primary Examiner*—David W. Wu
*Assistant Examiner*—Ling-Siu Choi

(57) ABSTRACT

A new and novel linear, regio-regular vicinal functionalized polymer methods of forming the same are described. The polymer has a linear hydrocarbon polymer backbone with vicinal functional groups having oxygen and/or nitrogen atom containing groups, such as hydroxy, carboxylic acid or ester, carbonyl acetate, amide, nitrile and the like, pendent from the polymer backbone chain in a regio-regular manner.

20 Claims, No Drawings

REGIO-REGULAR COPOLYMER AND METHODS OF FORMING SAME

This application is a Divisional Application of co-pending U.S. application Ser. No. 09/052,079, filed on Mar. 31, 1998 now U.S. Pat. No. 6,153,714.

The invention of this application was made with United States Government support under Contract No. 70NANB5H1136 awarded by the U.S. Department of Commerce's National Institute of Standards and Technology. The United States has certain rights in the invention.

BACKGROUND OF THE INVENTION

The subject invention is directed to new and novel regio-regular, functionalized hydrocarbon polymers (i.e., polymers bearing oxygen and/or nitrogen atom in pendent functional groups) and methods of forming the same. Specifically, the present invention is directed to regio-regular polymers having substantially all vicinal (i.e., head-to-head) configuration of functional groups pendent from the polymer backbone chain. The polymers are formed by ring-opening metathesis polymerization of a $C_7-C_{12}$ cycloalkene having a vicinal pair of functional groups pendent from ring carbon atoms. The resultant polymer may then be hydrogenated to provide a substantially straight chain alkylene polymer having head-to-head pendent functional groups periodically distributed along the polymer chain. These polymers exhibit enhanced gas barrier and/or tensile properties and have other properties which make them useful in forming films and other articles.

High pressure, free radical polymerization has been an important industrial technique for providing a wide variety of polymer products. The technique requires an initiator, such as a peroxide, to initiate the chain growth. A variety of homopolymers and copolymers have been formed by this technique. However, the monomeric units forming the copolymers are normally randomly distributed along the polymer chain backbone and the polymer has a high degree of short and long chain branching due to side reactions. Even when forming functional group containing homopolymers, there is a high degree of head-to-tail arrangement of the functional groups with respect to the polymer chain. Head-to-tail orientation of consecutive mers of a vinyl polymer can be simply represented as: —$CH_2$—$CHX$—$CH_2$—$CHX$—, while head-to-head orientation is represented as: —$CH_2$—$CHX$—$CHX$—$CH_2$—, where X represents functional groups. Normally, only small amounts of head-to-head arrangement of functional group containing monomeric units may be found in polymers formed by free radical polymerization.

More recently, polymerizations have been conducted with Ziegler-Natta or metallocene catalyst. However, polymerization by this technique is generally limited to non-functionalized monomers, such as olefins suitable for forming polyethylene, polypropylene and the like.

Ring opening metathesis polymerization (ROMP) has been studied during the past two decades using early transition metal complexes. These studies were conducted on strained cyclic olefins to provide polymers of controlled molecular weight and structure. For example, cyclobutenes have been the subject of ROMP to provide poly(butadiene) or polybutenamer. It has been well documented that this polymerization is driven by the high strain energy of the cyclobutene ring (29.4 kcal/mol). In Makromol. Chem. 1962, 56, 224, Dall'Asta et al first reported the ROMP of cyclobutene using $TiCl_4/Et_3Aa$ to provide a polybutadiene having high cis configuration. Other two component ROMP catalyst systems have been used to polymerize cyclobutene and its derivatives. In addition, one component catalysts, such as $Ph(MeO)C=W(CO)_5$, $PhC=WCO_5$ and $RuCl^3$ were successfully used in similar polymerizations.

However, in none of the above cases was a living polymerization observed. Polymerization reactions are considered living when the reaction is capable of proceeding substantially in the absence of termination steps and chain transfer reactions. When the rate of polymer chain initiation occurs faster than chain propagation the living system affords polymers of controllable molecular weight and narrow polydispersity. Living polymerization systems are also capable of synthesizing block copolymers (see Noshay et al, Block Copolymers, Academic Press, N.Y. 1977).

The area of functionalized polyolefins has received great attention recently. The fine tuning of the type and amount of functional groups, as well as the location of the functional groups on the polymer backbone to optimize the properties which can be achieved by a particular polymer has been of great interest. Functionalized alkylene polymers have conventionally been prepared by free-radical or anionic polymerization of vinyl monomers. However, such S polymerization techniques of functionalized vinylically unsaturated monomers have provided polymers with a preponderance of head-to-tail configuration of the monomeric units, with a high degree of branching and, where copolymerization is conducted, the monomeric units are generally randomly distributed along the polymer backbone chain. Due to the electrophilic nature of transition metal catalysts, such as metallocene or conventional Ziegler-Natta catalysts, towards a large variety of functional groups, the synthesis of polyolefins with polar functional groups has met with only limited success.

Recently, the ROMP of certain substituted strained cyclic and bicyclic olefins has been accomplished. 3-Methylcyclobutene and 3,3-dimethylcyclobutene as well as norbornene have been ring opened and polymerized. The ROMP of cyclobutenes which are substituted with acid or alcohol functional groups has only been accomplished indirectly. For example, highly strained 3,4-disubstituted cyclobutenes bearing benzyl-protected methylene ether or ester pendent groups have been subjected to ROMP followed by post-polymerization removal of the protection group to provide a polyallyl alcohol homopolymer product.

With the development of other metathesis initiators, such as those described by Nguyen et al in JACS 1992, 114, 3974 and JACS 1993, 115, 9858; by Schwab et al in JACS 1996, 118, 100; Schrock et al, in JACS 1990, 112, 3875; Fox et al in Inorg. Chem. 1992, 31, 2287; and by Grubbs et al, in U.S. Pat. No. 5,312,940, one has achieved metathesis polymerization of certain cyclic olefin compounds which contain functional groups. However, such polymerizations were not living polymerizations and, therefore non-linear, high dispersity polymer products were achieved. Further, the monomers were highly strained compounds, such as norbornene derivatives which provide a cyclic moiety within the polymer chain or, alternately, were mono functional acyclic olefins which provided polymers having the functional groups randomly located along the polymer chain.

It has been highly desired to provide a linear polyolefin polymer having pendent functional groups uniformly distributed in a controlled manner along the polymer backbone. Such polymers are believed capable of providing polymer films and articles having uniform structure and highly desired properties.

SUMMARY OF THE INVENTION

It has now been unexpectedly found that one can produce functionalized polymers which are substantially linear, have low polydispersity and whose functionality is regio-regular with respect to the backbone polymer chain. The present polymers have functional groups which are head-to-head in orientation to each other (are pendent from adjacent carbon atoms of the polymer backbone) and are positioned in a substantially uniform sequence with respect to the polymer backbone carbon atoms. Such new and novel functionalized, regio-regular polymers are suitable for providing improved packaging film products.

DETAILED DESCRIPTION

The subject polymers are capable of being formed by ring-opening metathasis polymerization of certain cyclic monoolefinic compounds having vicinal functional groups directly pendent from carbon atoms of the ring, as fully described herein below.

The cyclic olefin can be selected from a $C_7$–$C_{12}$ cyclohydrocarbon having one ethylenic unsaturation group as part of the ring structure. The cyclohydrocarbon may, for example, be selected from cycloheptene, cyclooctene, cyclononene, cyclodecene, cyclohendecene, cyclododecene and the like. The preferred cyclohydrocarbons are those having an even number of carbon atoms making up the ring. The term $C_7$–$C_{12}$ refers to the number of carbon atoms forming the ring structure of the cyclic olefin.

The unsaturated cyclohydrocarbon used in forming the present polymer must have vicinal functional groups pendent from carbon atoms of the ring. At least one carbon which is adjacent to the ethylenic group of the ring must be free of functional groups. That is, when numbering the ethylenic carbons 1 and 2, the next carbon and, preferably, the carbon having the highest number defining the ring should not contain pendent groups except for hydrogen atoms. The cyclohydrocarbon may, in addition to the vicinal functional groups, contain hydrocarbon or functional groups pendent from other carbon atoms except at least one carbon atom of the ring which is adjacent to the ethylenic group, as described above.

In general, the cyclic olefin found useful in providing the regio-regular polymer is a cycloalkene which can be represented as:

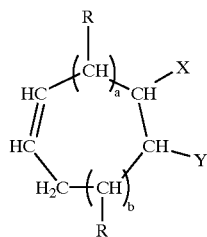

I wherein at least one carbon atom which is alpha with respect to the ethylenic group has only hydrogen atoms pendent therefrom, X and Y together represent functional groups which are pendent from vicinal carbon atoms of the cycloalkene and wherein X and Y each, independently are selected from hydroxyl, carboxylic acid, carboxylic acid esters of a $C_1$–$C_5$ alkyl, acetate, amide, nitrile or carbonyl group. It is preferred that X and Y represent the same functional group. The symbol "a" is a value of 0 to 6 and "b" has a value of 0 to 6 provided the sum of a+b is a value between 2 and 7. Each of the ring carbon atoms of "a" and "b" can be unsubstituted (contain only hydrogen atoms) or may be substituted with a $C_1$–$C_5$ (preferably a $C_1$–$C_2$) alkyl group or with a functional group, as described above.

The subject invention shall be discussed herein below in terms of hydroxylated polymers (where X and Y each represent an —OH group). These polymers can be viewed as copolymers of vinyl alcohol and an alkylene, such as ethylene, linear propylene and the like. For example, it has been found that ROMP of 5,6dihydroxycyclooctene provides a polymer which can be viewed as a copolymer of ethylene and vinyl alcohol. Ethylene/vinyl alcohol (EVOH) copolymers are commonly available. However, these polymers are presently formed by free radical copolymerization of ethylene and vinyl acetate followed by hydrolysis of the acetate groups to hydroxyl groups. The conventional EVOH copolymer contains each monomeric unit randomly distributed along the polymer chain, the hydroxyl groups (disregarding residual acetate groups) are generally configured head-to-tail when part of adjacent monomeric units and the polymer contains considerable branching. In contrast, a hydroxy-containing polymer provided by the present invention (a=2; b=1; X and Y=OH) can be viewed as analagous to an ethylene/vinyl alcohol copolymer with the unique feature of having ethylene and vinyl alcohol pairs of monomeric units in a sequential arrangement of ethylene-vinyl alcohol/vinyl alcohol-ethylene along the polymer chain. Further, the adjacent vinyl alcohol units are only in a head-to-head configuration.

Other functionalized polymers can be achieved in the manner fully described herein below. One can view the present invention as utilizing, as the starting compound, a vicinal disubstituted C7–$C_{12}$ cycloalkene (wherein $C_7$–$C_{12}$ refers to the number of ring carbon atoms) represented by the formula

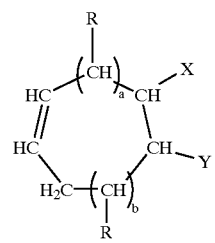

I wherein X and Y independently represent functional groups and preferably represent the same functional group, "a" represents a numerical value of 0 to 6 and "b" represents a numerical value of 0 to 6, provided the sum of a+b is from 2 to 7. Each of the ring carbon atoms of "a" and/or of "b" may be unsubstituted or further substituted, as described above. X and Y groups may be sterically positioned on the same side or opposite sides of the plane bisecting the ring carbon atoms except in the case of X and/or Y being a carbonyl group, in which case the group would be within the plane of the ring. In other words, X and Y may be either in a cis or trans configuration with respect to each other.

The formation of difunctional cycloalkenes (I) found useful herein can be achieved by known methods. For example, trans-5-cyclooctene-1,2diol can be prepared by reacting the monoepoxide of 1,5-cyclooctadiene with perchloric acid in an aqueous solution at elevated temperatures as taught in French Patent 1,294,313 which teaching is incorporated herein in its entirety by reference. Other methods of preparing the vicinal dihydroxy functionalized cycloalkene include reacting the cycloalkadiene monoepoxide with acetic acid and potassium acetate to initially form the hydroxy/acetate compound followed by saponification; oxidation of cycloalkadiene with peroxide and formic acid followed by basic hydrolysis [Yates et al., Canadian Journal of Chemistry, Vol. 50, 1548 (1972)]; reacting a cycloalkadiene monoepoxide with an organic acid, such as formic or acetic acid to form the hydroxy/acetate compound followed by saponification [McIntosh, Canadian Journal of Chemistry, Vol. 50, 2152 (1972)]; or reacting a cycloalkadiene with osmium tetroxide in ether/pyridine solution at low temperatures followed by reflux with sodium sulfite in water/alcohol [Leitich, Tetrahedron Letters, No. 38, 3589 (1978)].

A vicinal dione cycloalkene can be formed from the vicinal diol according to the procedure described by Yates et al., Canadian J. of Chem., Vol. 50, 1548 (1972).

The vicinal hydroxy/ketone cycloalkene and the vicinal ketone/acetate cycloalkene are formed by oxidizing the hydroxy/acetate with chromic acid in acetone at low temperatures (e.g., 0–10° C.) to form the ketone/acetate. The ketone/acetate cycloalkene can be recovered by distillation. The ketone/acetate can be converted to the vicinal hydroxy/ketone cycloalkene by hydrolysis with sodium hydroxide in methanol at slightly elevated temperatures (e.g., 40° C.).

The monoepoxy cycloalkene, which is the precursor of several of the synthetic routes described above can be obtained by catalytic oxidation of a cycloalkadiene using a peroxide and sodium tungstate as the catalyst as described by Venturello, in J. Org. Chem., 48, 3831 (1983) and J. Org. Chem., 53, 1553 (1988). Other methods of forming the epoxy cycloalkadiene are disclosed by Grubbs, Macromolecules, 28, 6311 (1995); Camps, J. Org. Chem. 47, 5402 (1982); Imuta, J. Org. Chem. 44, 1351 (1979); Murray, Org. Syn., 74, 91 (1996); and Payne, Tetrahedron, 18, 763 (1962).

The teachings of each of the above cited references is incorporated herein in its entirety by reference.

The vicinal functionalized disubstituted cycloalkene is subjected to ring opening metathesis polymerization using a well-defined ROMP catalyst. Such catalysts found useful herein are disclosed by Shrock et al in JACS 1990, 112, 3875; and U.S. Pat. Nos. 4,681,956; 5,312,940; and 5,342,909. The preferred catalysts are those described in U.S. Pat. No. 5,312,940. The teachings of each of the above references is incorporated herein in its entirety by reference.

One class of ROMP catalyst found useful in providing the present polymers can be represented by the general formula:

$$M(NR^1)(OR^2)_2(CHR^3) \qquad \text{II(a)}$$

wherein:

M is molybdenum or tungsten;

$R^1$ and $R^2$ of Formula II(a) are independently selected from alkyl, aryl, aralkyl or halogen-substituted derivatives or silicon-containing analogs thereof. Examples of aryl groups are phenyl, 2,6diisopropylphenyl and 2,4,6-trimethylphenyl. Examples of aralkyl groups are benzyl and triphenylmethyl. Examples of $R^1$ in Formula IIa are 2,6diisopropylphenyl, 2,4,6-trimethylphenyl, 2,6-di-t-butylphenyl, pentafluorophenyl, t-butyl, trimethylsilyl, triphenylmethyl, triphenylsilyl, tri-t-butylsilyl, and perfluoro-2-methyl-2-pentyl and the like. Examples of $R^2$ in Formula IIa are t-butyl, trifluoro-t-butyl $[(CF_3)(CH_3)_2C]$, perfluoro-t-butyl, perfluoro-2-methyl-2-pentyl, 2,6diisopropylphenyl, pentafluorophenyl, trimethylsilyl, triphenylsilyl, tri-t-butylsilyl, and hexafluoro-t-butyl $[(CF_3)_2(CH_3)C]$ and the like. $R^3$ of Formula II(a) is selected from an alkyl, aryl, aralkyl or any substituent that results from the initial reaction between the $M=CHR^3$ complex and the olefin(s) that is(are) being metathesized, alkyl has 1–20 carbons, aryl has 6–20 carbons and aralkyl has 7–20 carbons; $R^3$ is preferably t-butyl or phenyl, but since the $M\text{-}CHR^3$ moiety of the compound of Formula IIa is intimately involved in the catalytic reaction, it is recognized that the $CHR^3$ ligand is replaced by any other alkylidene fragment from the olefins that are being metathesized.

The catalyst IIa should not be used with monomer I which has a proton on the functional group, that is, for example hydroxyl, carboxylic acid and the like. It may be used where ester, acetate, carbonyl and the like groups are present.

The preferred ROMP catalysts are those represented by the general formula:

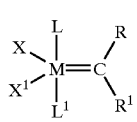

IIb wherein:

M is selected from Mo, W, Os or Ru; and preferably Ru or Os; and most preferably Ru;

R and $R^1$ are independently selected from hydrogen; $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl or $C_1$–$C_{20}$ alkylsulfinyl; each optionally substituted with $C_1$–$C_5$ alkyl, halogen, $C_1$–$C_5$ alkoxy or with phenyl group optionally substituted with halogen, $C_1$–$C_5$ alkyl or $C_1$–$C_5$ alkoxy; preferably R and $R^1$ are independently selected from hydrogen; vinyl, $C_1$–$C_{10}$ alkyl, aryl, $C_1$–$C_{10}$ carboxylate, $C_2$–$C_{10}$ alkoxycarbonyl, $C_1$–$C_{10}$ alkoxy or aryloxy; each optionally substituted with $C_1$–$C_5$ alkyl, halogen, $C$,-$C_5$ alkoxy or with a phenyl optionally substituted with halogen, $C_1$–$C_5$ alkyl or $C_1$–$C_5$ alkoxyl;

X and $X^1$ are independently selected from any anionic ligand; preferably X and $X^1$ are independently selected from halogen, hydrogen; $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, aryl or $C_1$–$C_{20}$ alkylsulfonyl or $C_1$–$C_{20}$ alkylsulfinyl; each optionally substituted with $C_1$–$C5$ alkyl, halogen, $C_1$–$C_5$ alkoxy or with a phenyl group optionally substituted with halogen, $C_1$–$C_5$ alkyl or $C_1$–$C_5$ alkoxyl;

L and $L^1$ are independently selected from any neutral electron donor, preferably L and $L^1$ are independently selected from phosphine, sulfonated phosphine, phosphite, phosphinite, phosphonite, arsine, stilbene, ether, amine, amide, sulfoxide, carbonyl, nitrosyl, pyridine or thioether; and wherein any 2, or 3 of X, $X^1$, L, $L^1$ may be optionally bonded together to form a chelating multidentate ligand.

The ROMP of the vicinal difunctional $C_7$–$C^{12}$ cycloalkene (I) may be carried out neat or by providing a solution of (I) in a hydrocarbon solvent such as, for example, aromatic hydrocarbons, such as, toluene, tetrahydrofuran, dialkyl ethers, cyclic ethers and the like and their halogenated derivatives, such as, halogenated aromatics as well as halogenated alkanes and the like. The preferred solvents are chlorinated alkanes, such as dichloromethane and the like, chlorinated aromatics, such as monochlorobenzene and the like. The molar ratio of I, to catalyst II should be from about 200 to 5,000, preferably from about 400 to 3000. The ROMP reaction may be carried out at temperatures of from about 10° C. to 75° C. and preferably from about 20° C. to 50° C. The most preferred temperature will depend on the particular starting material, the ROMP catalyst, and the solvent used and can be determined by minor experimentation and is usually in the range of from 35 to 50° C. The time dedicated to carrying out the ROMP reaction may range from only a few minutes to several hours, such as up to about 48 hours. The reaction time is normally from 2 to 30 hours, with 10 to 20 hours being preferred. The molecular weight of the formed polymer product can be regulated by (a) altering the monomer I to catalyst II ratio, and/or by (b) introducing a suitable acyclic olefin in small amounts to act as a chain transfer agent. Such agents should be soluble in the polymerization reaction media or monomer used and may be, for example, cis 3-buten-1-ol, cis 3-hexen-1-ol and the like. When used, the chain transfer agent (CTA) should be present in molar ratio of monomer I to CTA of from about 50 to 2000 and preferably from about 200 to 1000.

ROMP of the vicinal difunctional cycloalkene (I) above provides a polymer having repeating units of the general formula:

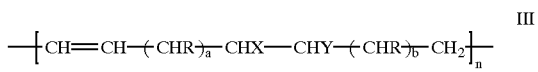

III wherein X, Y a and b are as defined above and each R independently represents hydrogen or a $C_1$-$C_5$ alkyl or an X group. It should be noted that the ROMP process of the cycloalkene (I) provides a polymer III having vicinal functional groups X and Y, the polymer chain is substantially linear, and the chain further contains an ethylenic unsaturation spaced (a) carbon atoms from the X functional group. In the polymer, groups X and Y may have the same or opposite stereo-configuration to that of the cyclic monomer used. Similarly, the polymer product III has double bonds which normally provide a mixture of both cis and trans geometric isomers (i.e., the alkenyl hydrogen atom may be cis or trans with respect to its nearest alkenyl hydrogen atom neighbor). Further, the above structure III is the repeating unit of the formed polymer and, thus, does not have any substantial degree of randomness of the X and Y groups and, as appropriate, the alkylene units along the polymer chain.

The polymer product m can be recovered by introducing a non-solvent into the solution to cause the polymer to precipitate out of solutions. Such non-solvents include for example, alkanes (e.g., pentane, hexane, heptane, etc.); ketones (e.g., acetone, methyl ethyl ketone, etc.) and the like. The particular non-solvent to be used can be readily determined by the artisan. The polymer product III can be readily recovered by introducing the polymerization reaction mixture into an excess of a non-solvent liquid.

The preferred conditions and catalyst for performing a ROMP of trans-5-cyclooctene-1,2-diol are:

| Catalyst: | Compound II(b) wherein X = $X^1$ = Cl<br>L = $L^1$ = tricycloalkylphosphine (e.g., tricyclohexylphosphine)<br>R = phenyl or 1,1-diphenylethenyl<br>$R^1$ = hydrogen |
|---|---|
| Solvent(s): | chlorinated alkanes (e.g., methylene chloride) |
| Temperature range: | 40–50° C. |
| Time range: | 6 to 24 hours |

The separated polymer III can be subjected to conventional catalytic hydrogenation or, optionally, chemical hydrogenation (e.g., using chemical hydrogenation agents, such as para-toluene sulfonyl hydrazide and the like) to provide a substantially completely saturated polymer IV. The structure of polymer IV repeating unit can be represented by the formula:

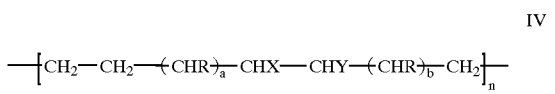

IV

Alternately, partial hydrogenation can be accomplished by controlling the hydrogenation reaction by known methods. Such methods may include controlling the molar ratio of olefinic groups of the polymer to chemical hydrogenation agent, the time of hydrogenation, etc. Where catalytic hydrogenation is employed, the degree of saturation can be controlled by the time and/or hydrogen pressure used. Thus, the resultant polymer IV may have residual ethylenic unsaturation to provide sites for grafting, insertion of other functional groups or for other desired reasons.

The hydrogenation of the polymer can be carried out using conventional hydrogenation, such as Wilkinson's catalyst and the use of hydrogen or the use of other conventional hydrogenation catalysts, such as Raney nickel, palladium on carbon, platinum on carbonate, ruthenium alkylidene complex or the like. The polymer is normally dissolved in a solvent or a mixture of solvents such as those described above for the ROMP polymerization and subjected to a hydrogen pressure of at least about 300 psi, preferably from about 600 to 5000 psi. The hydrogenation is normally complete in less than 8 hours although shorter or longer times may be utilized. Normally the hydrogenation is carried out for a period of from 2 to 8 hours with from 3 to 7 hours being preferred.

When the ROMP reaction of monomer I is carried out in solution, the resulting solution containing polymer III can be used directly to carry out the hydrogenation step. Thus, the step of separation of polymer III from the polymerization medium can be eliminated. Further, it is believed that any ROMP catalyst which may be present in the polymer III solution may aid in the hydrogenation reaction.

An alternate manner of forming the subject regio-regular polymer of the present invention is to subject a monoepoxy $C_7$-$C^{12}$ cycloalkene having at least one (and preferably both) ring carbon atoms adjacent to the ethylenic unsaturation as an unsubstituted carbon, to ROMP as described herein above for the vicinal difunctional monomer I. The intermediate polymer product is isolated by precipitation with a non-solvent followed by further conversion of the epoxy groups to the desired vicinal functional groups according to the synthetic routes described above. The resultant polymer III can be further hydrogenated to provide polymer IV in the manner described above.

Another alternate route to the present new and novel regio-regular polymer IV is to first epoxidize the ethylenic unsaturation units that are substantially uniformly distributed along a linear unsaturated hydrocarbon polymer chain. Conventional polymers which have unsaturation groups, such as conventional polybutadiene, isoprene and the like, are not linear polymers owing to the presence of pendent 1,2- or 3,4-double bonds. However, linear unsaturated hydrocarbon polymers having ethylenic units uniformly distributed within the polymer backbone chain can be formed by ROMP of a cycloalkene, such as a $C_7$-$C^{12}$ cycloalkene. The resultant polymer is linear and contains ethylenic unsaturation units uniformly distributed along the chain. These ethylenic units can then be epoxidized by standard techniques such as catalytic oxidation using a peroxide and a tungstate catalyst. The epoxy groups can then be converted to the desired vicinal functional groups, using the synthesis methods described above, to provide polymer product IV.

In addition to forming polymers III and IV from a single monomer I, as described above, one can form copolymers by ROMP of monomer I having X and Y functional groups and ROMP of a comonomer Ia. Comonomer I(a) can be selected from a cycloalkene represented by the formula:

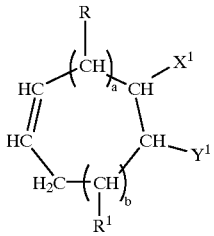

Ia wherein $X^1$ and $Y^1$ have the same definition as X and Y described above for monomer I or may be selected (one or both) from hydrogen, provided $X^1$ and $Y^1$ together provide pairs which are distinct from the X and Y pairs of monomer I; $R^1$ has the same definition as R of monomer I and a and b are each independently an integer of 0–6 provided the sum of a+b is 0 or 2–7. The copolymerization by ROMP of monomers I and Ia to provide a linear copolymer of the subject invention can be carried out with molar ratios of I to Ia of from about 50:50 to about 100:0 with from 60:40 to 100:0 being preferred. Because the ROMP of the present monomer is substantially a living polymerization, one can introduce monomer I and monomer Ia sequentially into the polymerization reaction media to provide block(s) of unit III first defined above and block(s) of units III wherein X and Y are as defined immediately above. Thus a regio-regular block polymer product is formed which is linear and has vicinal functional units uniformly spaced in a head-to-head configuration at least along a portion of the polymer chain (derived from monomer I) and a second segment of the polymer chain possibly having a second set of vicinal functional units uniformly configured along a portion of the same polymer chain (derived from monomer Ia). This copolymer may be hygogenated, as described above for the homopolymer.

The polymers produced by the present invention have been compared to their counterpart copolymer formed by conventional free-radical polymerization and have been observed to have superior elongation properties as well as enhanced toughness, lower melting temperature and lower density. The polymers are useful in forming films or coatings and the like, for packaging applications. For example, regio-regular vicinal hydroxy functional polymers formed according to the present invention have been found to have superior toughness and elongation properties, and lower gas permeability properties than analagous conventional free radical formed copolymers having comparable hydroxyl content. Similarly, copolymers of the subject invention can provide films or coatings having a high degree of puncture resistance, toughness, and print adhesion properties.

The following examples are given for illustrative purposes only and are not meant to be a limitation on the claimed invention appended hereto. All parts and percentages are by weight unless otherwise stated.

EXAMPLE 1

Ring-Opening Metathesis Polymerization (ROMP) of 5-cyclooctene-trans-1,2-diol

A three-neck, 300 ml resin kettle equipped with a mechanical stirrer, an argon inlet and a septum was charged with 5-cyclooctene-trans-1,2-diol (40 grams, 0.28 moles). The monomer was degassed under vacuum for 2 hours. The contents of the reaction vessel was maintained under an inert atmosphere of argon. Methylene chloride (30 ml) was sparged with a vigorous stream of argon for 30 minutes and transferred via cannula to the resin kettle. The monomer/solvent solution was stirred vigorously. In a separate glass vial equipped with a septum, the ruthenium catalyst phenyl-methylenebis (tricyclohexylphosphine)dichloride (0.31 grams, 0.27 mmoles) was dissolved under dry box conditions in 10 ml of argon purged methylene chloride. The catalyst solution was syringed into the reaction vessel. The reaction mixture was heated to 40° C. with an oil bath and kept under a slow stream of argon for 24 hours with vigorous stirring. Subsequently, the resin kettle was removed from the oil bath and the reaction mixture was cooled to ambient temperature. Ethyl vinyl ether (0.75 grams, 10.5 mmoles) was added to the reaction mixture and stirred for 1 hour. The polymer solution was then dissolved in a mixture of 40 ml of tetrahydrofuran, 40 ml of methanol and 0.4 grams of 2,6-di-tert-butyl-4-methylphenol. After the polymer was completely dissolved to form a homogeneous solution, it was precipitated in cold acetone (chilled with an ice bath). The polymer was redissolved in a mixture of 20 ml tetrahydrofuran, 20 ml of methanol and 0.4 grams of 2,6di-tert-butyl-4-methylphenol and reprecipitated in cold acetone. This process was repeated again. The polymer was collected and dried overnight in a vacuum oven at 60° C. 13.4 grams of a hard solid, yellow polymer was obtained (Polymer 1-U). The polymer molecular weights were determined by GPC at 50° C. using a Waters Alliance System #4 gel permeation chromatograph equipped with a Waters 41 ORI detector. Phenolgel 5 columns (2×linear and 1×100 Å) were used. The eluent was 1-methyl-2-pyrrolidinone/50 mM lithium bromide. Polystyrene standards were used for calibration. The number average molecular weight (Mn), weight average molecular weight (Mw) and polydispersity (PDI) were determined. For the particular polymer prepared in this example (Polymer I-U), the Mn, Mw and PDI were 9,500, 27,800 and 2.9, respectively.

EXAMPLE 2

Hydrogenation of the Polymer Prepared in Example 1 to a Linear Regio-Regular Polymer A 600 ml Parr reactor equipped with a glass liner was used for the hydrogenation reaction. Polymer 1-U (12.0 grams, 0.0844 moles of double bonds) was dissolved in a mixture of 60 ml of tetrahydrofuran and 60 ml of methanol. Wilkinson's catalyst, [tris(triphenylphosphine) rhodium(I) chloride] (0.52 grams, 0.56 millimoles) (prepared from triphenylphosphine and rhodium (E) chloride in ethanol), was added to the polymer solution. The reactor headplate assembly was secured to the reactor body and the inlet and vent valves of the reactor were closed. The reactor was placed in a heating mantle and connected to a pneumatic stirrer. A thermocouple was connected to the reactor. The hydrogenation process was carried out at about 54° C. under a hydrogen pressure of 600 psi for 6 hours. After the reaction was complete, the reactor was vented slowly and the reaction mixture was filtered through a coarse glass fritted funnel. The solid polymer was washed with acetone and re-suspended in acetone and stirred overnight. The polymer dispersion was then filtered and rinsed with 2 portions of acetone. The final polymer (Polymer 1-S) was dried in a vacuum oven at 60° C. overnight. The resulting polymer was a fine powder with a light tan color and can be viewed as a substantially linear, regio-regular ethylene/vinyl alcohol copolymer having 50 mole percent vinyl alcohol units in head-to-head configuration. The molecular weights of the resulting polymer were: Mn=23,900, Mw=47,000 and PDI=2 which are further reported in Table II below. The melt flow index of the polymer was determined at 190° C. with 2.16 Kg mass according to ASTM D1238 using a CSI MFI-2 melt flow indexer and this value is further reported in Table III below. The polymer was stabilized with 1% by weight Ultranox 2714A(GE) for the melt flow index measurements. Polymer 1-S had a melt pow index greater than 10 grams/10 minutes. The copolymer had a glass LE transition temperature (Tg) of 45° C. and a melting point, as determined by Differential Scanning Calorimeter (DSC), was 148° C.

EXAMPLE 3

Comparison of Mechanical Properties of Linear Regio-Regular Vicinal Hydroxy Functionalized Polymer Versus Conventional Branched Ethylene-Vinyl Alcohol Random Copolymer The polymer produced in Example 2 above (hydroxy content equivalent to that of an ethylene/vinyl alcohol copolymer having 50 mole percent vinyl alcohol units) was compared to a commercially available ethylene-vinyl alcohol copolymer having 56 mole percent vinyl alcohol units, predominantly in a head-to-tail configuration. The commercial copolymer is formed from the copolymerization of ethylene and vinyl acetate followed by conversion of the acetate groups to hydroxyl groups. All tests were performed by conventional methods and the same conditions were used for testing both polymer samples. Table I below shows the properties of the conventional branched polymer having 56 mole percent vinyl alcohol (EVAL, a product of EVALCA Co.) and polymer of Example 2.

TABLE I

|  | Comm. EVOH 56 mole % VOH Branched | Polymer Ex. 2 50 mole % VOH Linear |
| --- | --- | --- |
| THERMAL PROPERTIES |  |  |
| Melting Point (DSC/° C.) | 165 | 148 |
| Crystallization Temperature (DSC/° C.) | 142 | 118 |
| Glass Transition Temperature (DMTA/° C.) | 55 | 45 |
| Crystallinity (DSC, wt %) | 27 | 23 |
| PHYSICAL PROPERTIES |  |  |
| Modulus/ksi (sd) | 337.2 (8.7) | 180.3 (1.1) |
| Yield Stress/psi (sd) | 7737 (66) | 4663 (159) |
| Yield Strain/% (sd) | 4.3 (0.2) | 5 (0.3) |
| Maximum Stress/psi (sd) | 9093 (851) | 6578 (1160) |
| Break Stress/psi (sd) | 7686 (1322) | 6520 (1199) |
| Break Strain/% (sd) | 11.8 (8.8) | 221 (34) |
| Toughness/in.lb/in³ (sd) | 888 (743) | 9226 (2089) |
| Density g/cm³ | 1.144 | 1.098 | sd = standard deviation
DMTA = dynamic mechanical thermal analysis

The above shows that Polymer 2 has enhanced flexibility (lower modulus), toughness, elongation properties and has a lower melting point. These properties show that the present Polymer 2 can be more readily extrudable as film products having enhanced toughness.

EXAMPLE 4

Ring-Opening Metathesis Polymerization (ROMP) of 5-cyclooctene-trans-1,2-diol 5-cyclooctene-trans-1,2-diol (50 grams, 0.35 moles) was transferred to a three-neck, 300 ml resin kettle equipped with a mechanical stirrer, an argon inlet and a septum. The monomer was degassed under vacuum for one hour. The contents of the reaction vessel was kept under an argon atmosphere. Methylene chloride (40 ml) was sparged for 15 minutes using a stream of argon and then cannula transferred to the resin kettle. The monomer/solvent solution was stirred vigorously. In an argon filled drybox, the ruthenium catalyst phenylmethylene bis(tricyclohexylphosphine) dichloride (0.72 grams, 0.879 mmoles) was weighed into a septum capped glass vial and dissolved in 10 ml of methylene chloride. The deep purple catalyst solution was injected via syringe into the reaction vessel. The reaction mixture was heated and maintained at 40° C. under an argon atmosphere with vigorous stirring for 24 hours. Subsequently, the resin kettle was removed from the heat and the reaction mixture was cooled to ambient temperature. Ethyl vinyl ether (2.92 grams, 3.9 ml, 40.4 mmoles) was added to the reaction mixture and stirred for 1.5 hours. A mixture of 100 ml of methanol, 50 ml of methylene chloride and 0.5 grams of 2,6-di-tert-butyl4-methylphenol were added to the reaction mixture to dissolve the polymer. The homogeneous solution was subsequently poured into a solution of 1200 ml of cold acetone and 0.5 g of butylated hydroxytoluene (BHT) to precipitate the polymer. The polymer was redissolved in a mixture of 100 ml of methylene chloride, 100 ml of methanol and 0.5 grams of BHT. 2,4-pentanedione (0.25 ml) was added and the solution was stirred for 15 minutes. The polymer was reprecipitated in cold 5 acetone as previously done. Dissolution and reprecipitation was repeated one more time. The polymer was collected by filtration and dried overnight in a vacuum oven at 60° C. to yield 22.6 grams of a hard solid, yellow polymer having ethylenic unsaturation in the polymer chain (designated as Polymer 2-U). The polymer molecular weights are reported in Table II below.

EXAMPLE 5

Ring-Opening Metathesis Polymerization (ROMP) of 5-cyclooctene-trans-1,2-diol using a Chain Transfer Agent 5-cyclooctene-trans-1,2-diol (50 grams, 0.35 moles) was transferred to a three-neck, 250 ml resin kettle equipped with a mechanical stirrer, an argon inlet and a septum. The monomer was degassed under vacuum for one hour. The contents of the reaction vessel was then kept under an argon atmosphere. Distilled cis-3-hexen-1-ol (0.13 grams, 1.35 mmoles, 0.16 ml) was added by syringe. Methylene chloride (40 ml) was sparged for 15 minutes with a vigorous stream of argon and then cannula transferred into the resin kettle. The monomer/solvent solution was stirred vigorously. In an argon filled drybox, ruthenium catalyst, phenylmethylene bis(tricyclohexylphosphine) dichloride (0.11 grams, 0.141 mmoles), was weighed into a septum capped glass vial and dissolved in 10 ml of methylene chloride. The catalyst solution was injected via syringe into the reaction vessel. The reaction mixture was heated and maintained at 40° C. while being vigorously stirred under an argon atmosphere for 24 hours. The reaction mixture was then cooled to ambient temperature. A mixture of ethyl vinyl ether (2.92 grams, 3.9 ml, 40.4 mmoles) was added to the reaction mixture along with 50 ml of methanol and 0.5 grams of 2,6-di-tert-butyl-4-methylphenol. After two hours, the homogeneous polymer solution was precipitated in 2 portions of non-solvent, each containing 500 ml of cold acetone and 0.5 g of butylated hydroxytoluene (BHT). The polymer was redissolved in a mixture of 50 ml of methylene chloride, 50 ml of methanol and 0.5 grams of BHT. 2,4-pentanedione (0.25 ml) was added and the solution was stirred for 15 minutes. The polymer was again precipitated using cold acetone, as previously done. This process was repeated one more time. The polymer was collected by filtration and dried overnight in a vacuum oven at 60° C. to yield 18.9 grams of a hard solid, colorless polymer (designated as Polymer 3-U). The polymer molecular weights are shown in Table II.

EXAMPLE 6

Hydrogenation of poly(5-cyclooctene-trans-1,2-diol) prepared in Example 4

A 600 ml Parr reactor was used for the hydrogenation and a glass liner that fits inside the body of the reactor was used as the reaction vessel. Polymer 2-U (20 grams, 0.14 moles of olefins) was dissolved in a mixture of 82 ml of tetrahydrofuran, 82 ml of methanol, 20 ml methylene chloride and 0.2 grams of BHT Wilkinson's catalyst, [tris (triphenylphosphine) rhodium(I) chloride] (prepared from triphenylphosphine and rhodium (III) chloride in ethanol), (0.869 grams, 0.939 millimoles) was added to the polymer solution. The reactor headplate assembly was secured to the reactor body and the inlet and vent valves of the reactor were closed. The reactor was placed in a heating mantle and connected to a pneumatic stirrer. A thermocouple was connected to the reactor. The hydrogenation process was carried out at 60° C. under a hydrogen pressure of about 600 psi for 6 hours. After the reaction was complete, the reactor was vented slowly and the reaction mixture was blended with 600 ml of acetone and 0.2 grams of BHT. The solid polymer was recovered by filtration and rinsed with acetone. The polymer powder was resuspended in 600 ml of acetone and 0.2 grams of BHT and stirred overnight. The polymer dispersion was then filtered and rinsed with acetone. The final polymer was collected by filtration and dried in a vacuum oven at 60° C. The resulting polymer (designated as Polymer 2-S) was a fine powder with a light tan color. The yield of the polymer after hydrogenation was greater than 90 weight percent. The molecular weights and melt flow property of Polymer 2-S are shown in Tables II and III.

EXAMPLE 7

Hydrogenation of poly(5-cyclooctene-trans-1,2diol) prepared in Example 5

Polymer 3-U as prepared in Example 5 (17 grams, 0.1195 moles of olefins) was dissolved in a mixture of 70 ml of methanol, 70 ml of THF, 17 ml of methylene chloride and 0.17 grams of BHT. Wilkinson's catalyst (0.739 grams, 0.798 mmoles) was added to the polymer solution. The hydrogenation was carried following the procedure as described in Example 6 at about 60° C. for 6 hours at a hydrogen pressure of about 600 psi. The work-up procedure to the polymer after hydrogenation was conducted as described in Example 6. A white polymer powder was obtained (designated as polymer 3-S). See Tables 2 and 3 for molecular weight data and melt flow properties.

EXAMPLE 8

Direct Hydrogenation of poly(5-cyclooctene-trans-1,2-diol)

Another ROMP reaction was repeated conducted as described in Example 5. At the end of the ROMP reaction, 3.9 ml (2.92 grams, 40.4 mmoles) of ethyl vinyl ether was added to the reaction mixture along with a mixture of 100 ml of methanol, 100 ml of tetrahydrofuran and 0.5 grams of 2,6-di-tert-butyl-4-methylphenol. The hydrogenation of the polymer in solution was carried out following the procedure of Example 6 using 2.17 grams (2.34 mmoles) of Wilkinson's catalyst A white polymer powder product (25.4 grams) were obtained (designated as Polymer 4-S). The molecular weight data and the melt flow index of the polymer are shown in Tables 2 and 3.

EXAMPLE 9

A Waters Alliance System #4 gel permeation chromatograph equipped with a Waters 410RI detector was used for polymer molecular weight determination. Phenogel 5 columns (2×linear and 1×100 Å) were used. The eluent was 1-methyl-2-pyrrolidinone/50 mM lithium bromide and the GPC's were run at 50° C. Polystyrene standards were used for calibration.

TABLE II

Molecular Weight of Polymers

|  | Mn | Mw | Mz | PDI |
|---|---|---|---|---|
| Polymer 1-U | 9,500 | 27,800 | 50,000 | 2.9 |
| Polymer 1-S | 23,900 | 47,000 | 78,900 | 2.0 |
| Polymer 2-U | 15,900 | 56,100 | 112,000 | 3.5 |
| Polymer 2-S | 24,800 | 75,100 | 149,000 | 3 |
| Polymer 3-U | 41,700 | 110,000 | 201,000 | 2.6 |
| Polymer 3-S | 66,200 | 146,000 | 252,000 | 2.2 |
| Polymer 4-S | 31,300 | 145,000 | 269,000 | 4.6 |

The melt flow index of the polymers were determined at 190° C. with 2.16 Kg according to ASTM D1238 using a CSI MFI-2 melt flow indexer.

TABLE III

Melt Flow Property of Polymers

| | Melt Flow Index (grams/10 minutes) | | | |
|---|---|---|---|---|
| Stabilizer | Polymer 1-S | Polymer 2-S | Polymer 3-S | Polymer 4-S |
| 0.5 wt % sodium acetate |  | 3.3 | 3.4 |  |
| 0.5 wt % sodium acetate + 0.5% wt % Ultranox 626 | 10 |  | 2.3 | 1.4 |

What is claimed is:

1. A polymer product comprising a regio-regular, vicinal functionalized polymer represented by the formula:

IV

wherein each X and Y independently represents a functional group, each R independently represents a hydrogen, $C_1$–$C_5$ alkyl, or an X group, a and b each independently represents an integer of 0 to 6 provided that the sum of a+b is from 2 to 7 and n has a value of at least 10.

2. The polymer product of claim 1 wherein each R represents hydrogen.

3. The polymer product of claim 1 wherein at least one R represents a $C_1$–$C_3$ alkyl.

4. The polymer product of claim 3 wherein at least one R represents methyl.

5. The polymer product of claim 1, 2, 3 or 4 wherein said functional groups are selected from hydroxyl, carboxylic acid, carboxylic acid ester, acetate, carbonyl, amide or nitrile group.

6. The polymer product of claim 5 wherein X and Y are each hydroxyl groups.

7. The polymer product of claim 5 wherein X and Y are selected from carboxylic acid or ester groups.

8. The polymer product of claim 5 wherein X is carbonyl.

9. The polymer product of claim 5 wherein X is an acetate group.

10. The polymer product of claim 6 wherein each R is hydrogen, a is 2 and b is 1.

11. The polymer product of claim 5 wherein said regio-regular, vicinal functionalized polymer further comprises units represented by the formula:

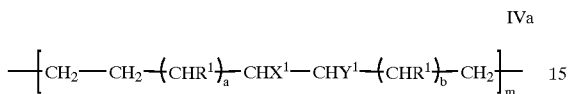
IVa wherein each $X^1$ and $Y^1$ independently represents a functional group selected from hydroxyl, carboxylic acid, carboxylic acid ester, acetate, carbonyl, amide or nitrile, or hydrogen; each $R^1$ independently represents hydrogen, $C_1$–$C_5$ alkyl, or $X^1$, a and b each represents an integer of 0 to 6 provided that the sum of a and b is 0 or 2 to 7 and m has a value of at least about 5.

12. The polymer product of claim 10 wherein said regio-regular, vicinal functionalized polymer further comprises units represented by the formula:

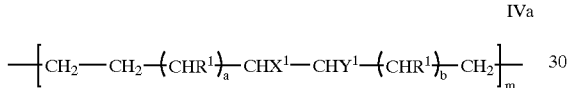
IVa wherein each $X^1$ and $Y^1$ independently represents a functional group selected from hydroxyl, carboxylic acid, carboxylic acid ester, acetate, carbonyl, amide or nitrile, or hydrogen; each $R^1$ independently represents hydrogen, $C_1$–$C_5$ alkyl, or $X^1$, a and b each represents an integer of 0 to 6 provided that the sum of a and b is 0 or 2 to 7 and m has a value of at least about 5.

13. A method of forming a regio-regular polymer having functional groups pendent from vicinal carbon atoms of the polymer backbone and located in a regular sequential arrangement along the polymer chain, comprising polymerizing a vicinal functionalized $C_7$–$C_{12}$ cycloalkene having the general formula

I wherein X and Y, each independently, is selected from a functional group; a and b each independently represents an integer from 0 to 6 provided a+b has a value of 2 to 7; each R independently represents hydrogen, a $C_1$–$C_5$ alkyl or X; by contacting said vicinal functionalized $C_7$–$C_{12}$ cycloalkene with a ROMP catalyst agent to form a linear first polymer having alternating vicinal functional groups and ethylenic unsaturation groups;

hydrogenating said first polymer to reduce at least a portion of the ethylenic unsaturation groups therein.

14. The method of claim 13 wherein the polymerization is carried out by further contacting a second cycloalkene of the general formula:

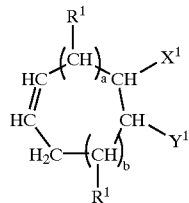
Ia wherein $X^1$ and $Y^1$ each independently is selected from a functional group or hydrogen provided the pair $X^1$ and $Y^1$ are distinct from the pair X and Y; a and b each represent an integer of from 0 to 6 provided the sum of a+b has a value of 0 or 2 to 7; and each $R^1$ independently represents hydrogen, a $C_1$–$C_5$ alkyl or X.

15. The method of claim 14 wherein the vicinal functionalized $C_7$–$C_{12}$ cycloalkene and the second cycloalkene are sequentially contacted with the ROMP catalyst.

16. The method of claim 13 wherein the ROMP catalyst is selected from a compound represented by the formula:

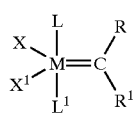
IIb wherein:

M is selected from Mo, W, Os or Ru; and preferably Ru or Os; and most preferably Ru;

R and $R^1$ are independently selected from hydrogen; $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl or $C_1$–$C_{20}$ alkylsulfinyl; each optionally substituted with $C_1$–$C_5$ alkyl, halogen, $C_1$–$C_5$ alkoxy or with phenyl group optionally substituted with halogen, $C_1$–$C_5$ alkyl or $C_1$–$C_5$ alkoxy; preferably R and $R^1$ are independently selected from hydrogen; vinyl, $C_1$–$C_{10}$ alkyl, aryl, $C_1$–$C_{10}$ carboxylate, $C_2$–$C_{10}$ alkoxycarbonyl, $C_1$–$C_{10}$ alkoxy or aryloxy; each optionally substituted with $C_1$–$C_5$ alkyl, halogen, $C_1$–$C_5$ alkoxy or with a phenyl optionally substituted with halogen, $C_1$–$C_5$ alkyl or $C_1$–$C_5$ alkoxyl;

X and $X^1$ are independently selected from any anionic ligand; preferably X and $X^1$ are independently selected from halogen, hydrogen, $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, aryl or $C_1$–$C_{20}$ alkylsulfonyl or $C_1$–$C_{20}$ alkylsulfinyl; each optionally substituted with $C_1$–$C_5$ alkyl, halogen, $C_1$–$C_5$ alkoxy or with a phenyl group optionally substituted with halogen, $C_1$–$C_5$ alkyl or $C_1$–$C_5$ alkoxyl;

L and $L^1$ are independently selected from any neutral electron donor, preferably L and $L^1$ are independently selected from phosphine, sulfonated phosphine, phosphite, phosphinite, phosphonite, arsine, stilbene, ether, amine, amide, sulfoxide, carbonyl, nitrosyl, pyridine or thioether; and wherein any 2, or 3 of X, $X^1$, L, $L^1$ may be optionally bonded together to form a chelating multidenate ligand.

17. The method of claim 13 wherein the molar ratio of I to II is from 200 to 5000.

18. The method of claim 13 wherein the vicinal functionalized $C_7$–$C_{12}$ cycloalkene and ROMP catalyst are contacted in solution.

19. The method of claim 13 wherein the vicinal functionalized $C_7$–$C_{12}$ cycloalkene, the second cycloalkene and ROMP catalyst are contacted in solution at a temperature of about 10° C. to 65° C. for a time of from about 2 to 48 hours.

20. The method of claim 13 wherein the vicinal functionalized $C_7$–$C_{12}$ cycloalkene, the second cycloalkene and ROMP catalyst are contacted sequentially in solution.

* * * * *